United States Patent
Vargas Da Silva

(10) Patent No.: US 7,441,455 B2
(45) Date of Patent: Oct. 28, 2008

(54) APPARATUS FOR MEASURING AND INDICATING THE LEVEL AND/OR VOLUME OF A LIQUID STORED IN A CONTAINER

(75) Inventor: Jayme Roberto Vargas Da Silva, São Paulo (BR)

(73) Assignee: Indebrás Indústria Electromecãnica Brasileira Ltda., São Paulo (BR)

( * ) Notice: Subject to any disclaimer, the term of this patent is extended or adjusted under 35 U.S.C. 154(b) by 0 days.

(21) Appl. No.: 11/413,336

(22) Filed: Apr. 28, 2006

(65) Prior Publication Data

US 2007/0006646 A1    Jan. 11, 2007

(30) Foreign Application Priority Data

Jul. 5, 2005     (BR) .................................. 0504625

(51) Int. Cl.
 G01F 23/26     (2006.01)
 G01F 23/00     (2006.01)

(52) U.S. Cl. ................................. 73/304 R; 73/304 C

(58) Field of Classification Search ............... 73/304 C, 73/304 R, 290 B; 702/55; 340/620; 361/284; 116/227

See application file for complete search history.

(56) References Cited

U.S. PATENT DOCUMENTS

| | | | | |
|---|---|---|---|---|
| 3,777,257 A * | 12/1973 | Geisselmann | ............... | 324/663 |
| 4,417,472 A * | 11/1983 | Tward | ...................... | 73/304 C |
| 4,444,051 A * | 4/1984 | Yamaki et al. | ............ | 73/304 C |
| 4,611,489 A * | 9/1986 | Spaargaren et al. | ....... | 73/304 C |
| 6,367,325 B1 * | 4/2002 | Schellenberg | ................. | 73/305 |
| 6,871,540 B2 | 3/2005 | Barlian et al. | ................. | 73/305 |
| 6,880,398 B2 | 4/2005 | Okamoto | ..................... | 73/319 |
| 6,907,780 B1 | 6/2005 | Meagher | ...................... | 73/299 |
| 2003/0000303 A1 * | 1/2003 | Livingston et al. | ........ | 73/304 C |

\* cited by examiner

Primary Examiner—Hezron E. Williams
Assistant Examiner—Tamiko D Bellamy
(74) Attorney, Agent, or Firm—Frommer Lawrence & Haug LLP; Ronald R. Santucci

(57) ABSTRACT

The present invention refers to an apparatus for measuring the level and/or volume of a liquid stored in a container. The apparatus comprises at least one pair of electrodes mounted in the interior of the container in such a position that said electrodes are partially or totally immersed in the liquid stored in the container, said pair of electrodes acting as one of the capacitors of a Wien bridge to modify the output signal generated by the bridge-circuit to, in addition to measuring and indicating the volume of the liquid, also providing an indication of the quality of the liquid in the container and/or the ratio between two different types of liquid stored in the container.

10 Claims, 1 Drawing Sheet

APPARATUS FOR MEASURING AND INDICATING THE LEVEL AND/OR VOLUME OF A LIQUID STORED IN A CONTAINER

This application claims priority benefits from Brazilian Patent Application No. PI0504625-4 filed Jul. 5, 2005.

BACKGROUND OF THE INVENTION

1. Field of the Invention

The present invention refers to apparatuses for detecting and measuring the level of a fluid stored inside a container or a tank. More specifically, the present invention refers to an apparatus for measuring the level of a liquid fuel in a tank in an automobile vehicle. In addition to measuring and indicating the volume of fuel, the apparatus according to the present invention may also provide an indication of the quality if the fuel in the tank and/or the ratio between the two different types of fuels, in the case of bi-fuel engines.

2. Description of the Prior Art

Typically, an internal combustion engine uses a liquid fuel such as diesel, kerosene, gasoline, alcohol and others, or even more than one type of these mentioned fuels, such as it is the case of bi-fuel engines, which fuels are stored in a tank that is separate from the engine.

These tanks are designed to store a volume of fuel sufficient to ensure a sustained operation of the engine. That is, automobiles are traditionally manufactured with fuel tanks having a storage capacity sufficient to ensure a continuous operation to allow it to run for at least a few hundreds kilometers.

In order to provide the driver a safe information regarding the autonomy of the vehicle or, in another words, what distance can still be covered with the volume of fuel in the tank, vehicles are usually provided with monitoring devices that continuously measure and indicate the amount of fuel left in the tank to inform driver about the need to refuel before exhausting all the fuel in the tank.

Generally speaking, a typical monitoring system comprises a measuring unit positioned within the fuel tank and an indicating gauge in a location remote from the tank, usually on the dashboard of the vehicle. The measuring unit determines the level of the fuel in the tank and sends a signal representative of this level and/or volume of fuel to the gauge in the dashboard, typically a dial that provides a visual indication of the amount of fuel left in the tank.

An automobile vehicle typically includes in its dashboard a fuel gauge having a pointer which gradually oscillates between the positions "full" and "empty" on the dial itself, as the vehicle moves from A to B thus indicating the volume of fuel left in the tank.

Traditional measuring units comprises a floating element such as a buoy, usually made of foam, coupled through a metallic rod to a variable resistance which acts as a potentiometer. As the buoy floats in the fuel, as the level of the fuel inside the tank varies, the position of the buoy and, consequently, the position of the metallic rod over the variable resistance also vary, therefore generating a variable voltage signal depending on the position of the buoy and on the angular inclination of the metallic rod which indicates the relative level of fuel in the tank.

The variable resistance is typically manufactured with a technology of conductive and resistive tracks deposition of a thick film over a ceramic substrate. Depending on the constructive form, this variable resistor operates immersed in the fuel itself or dry protected in a sealed off quenched chamber. This resistive component is commonly known simply as a "thick film".

As each vehicle has a geometric peculiar and particular tank design, the resistance is designed to compensate the non linearity of the relation between the level of the liquid and the volume of liquid effectively left in the tank, to allow the resulting signal to be effectively proportional to the volume of the fuel.

This linearity function of the relation between the liquid level and the liquid volume existing in the tank, duly represented by the variations in the resistive elements of the "thick film", makes each and every measuring unit something unique for each and every determined model of a vehicle thus stopping its usage in another vehicle which presents any difference in the geometry in relation to the very one for which it was designed.

A first and serious inconvenience of this measuring system comprising a buoy, a metallic rod and a variable resistance is exactly the very inadaptability of the measuring unit to other tanks designs.

Another serious inconvenience of this measuring system which comprises a buoy, a metallic rod and a variable resistance is the fact that it is easily influenced by any dislocation of the vehicle from a position of being totally plan.

Every time the vehicle changes from a substantially horizontal position, such as when the vehicle is going up or down a hill, the fuel level inside the tank varies and this variation truly affects the measuring being effected by the buoy's system, the metallic rod and the variable resistance.

While in normal traffic conditions this distortion is at least partially compensated by the frequent variations in the horizontal positioning of the vehicle, when it is in a relatively long uphill or downhill stretch this distortion may even cause a dry spell.

Another rather serious inconvenience of this measuring system is the fact that, in a general manner, the liquid fuels utilized are highly aggressive, something which could result in a mal functioning of the buoy, metallic rod and variable resistance system that generates non-correct measured levels of fuel.

Additionally, the mechanical nature of this very buoy, metallic rod and variable resistance system could also result in non-correct indications of the fuel level in the fuel tank. For example, the connection between the rod and the variable resistance and/or the very geometry of the tank could impose limitations to the rod's movement and thus the buoy could be partially submersed inside the fuel thus providing an inaccurate measurement.

Similarly, inaccuracy could take place when the amount of fuel present in the tank is very small, because of the fact that frequently the buoy's course does not extend down to the most inferior parts of the tank and thus the measuring unit sends an information to the exhibition panel which does not correspond to the reality because it indicates an empty tank whilst there could be a few liters left in its interior.

And as if the above-mentioned problems were not enough, the last few years have witnessed an increasing rise in the complexity of automobile vehicles projects and designs.

For example, with a view to increase the internal space of the cabin compartment, the designers are placing the different components of the vehicle in places where beforehand the utilization was simply unimaginable.

For the specific case of fuel tanks, the possibility of the utilization of materials of an easier moulding and resistance to the corrosive attack of fuels has opened the doors for an unnumbered amount of projects and designs of tanks, with the most different formats which permits to the designers a maximum utilization of the available space whilst maximizing the size of the tank and all that means we are frequently facing fuel tanks of the least conventional formats and shapes.

Therefore, due to the considerations of space and aerodynamics the tanks can be conformed in order to fit around the parts of the body or the chassis of the automobile, something that practically makes it unfeasible the utilization of the traditional buoy, metallic rod and variable resistance system in these tanks.

Evidently some safety regulations must be observed but in practical terms apart from the means to measure the level of fuel the only effective demand with regards to the project of a fuel tank for an automobile vehicle is that the feeding aperture be placed in such a manner as to permit an easy access and an easy insertion of the fuel pump pipe mouthpiece.

U.S. Pat. No. 6,880,398, of Apr. 19, 2005, discloses a fuel level inside a tank detection system coupled or integrated to a fuel pump that can be utilized in a variety of formats and sizes of tanks.

According to this patent the device comprises a body and a level of fuel detection unit, which body is configured being positioned inside the tank and it defines a plurality of coupling stages. The fuel level detection unit comprises a base, a buoy and an articulated element joining the buoy to the base in a similar form to the normal measuring unit and it is capable of being selectively coupled to each one of the coupling stations.

Still with regards to fuel level measuring systems inside a tank with mobile parts, other solutions can be the use of angle sensors substituting the "thick film" potentiometer and/or the techniques of inductive bridge with captive fluctuation (sliding in cavities). These two solutions are advantageous due to the fact of the sealing off and quenching between the captive fluctuation gadget itself (and its mechanism) and the sensor circuit.

However, due to the increasing difficulty of utilizing a buoy, rod and variable resistance measuring system, other solutions have been developed for the monitoring and for the measuring of the fuel level inside a fuel tank in an automobile vehicle.

U.S. Pat. No. 6,907,780, of Jun. 21, 2005 describes a method and an apparatus to determine the amount of fuel inside a tank by monitoring the pressure conditions and the temperature of the tank. An independent and separated air space is created and by monitoring the pressure conditions and the isolated space temperature and the pressure conditions and the temperature in the rest of the tank, the amount of fuel in it can be determined.

U.S. Pat. No. 6,871,540, of Mar. 29, 2005 describes a method and an apparatus to determine the amount of unloaded fuel from a tank through a system line, the difference between the amount of fuel originally stored inside the tank before unloading being calculated in order to indicate the amount of fuel inside the tank.

The forms of transducer which can promise the best solution for this problem are: optic, ultra sound and capacitive.

The use of any form of light in order to determine the level is confronted by the utilization of elements which transparency must be kept within the set, a difficult task indeed considering the accumulation of impurities that can occur within the tank.

Even though optical techniques such as photometry, colorimetry, nephelometry and refractometry can be considered in the future in order to determine the physical characteristics of the fuel, as long as they are duly coupled to a mechanism of automatic cleansing of the optical element in contact with the fluid.

The most easily viewed form in industry for the cleansing of these elements is the ultra sound, but a fuel level indicator with an accessible cost probably could not support its additional cost by the automobile industry, for the ultra sound and capacitance seems to be the two left ways.

The capacitive level sensors are widely known in the industrial instrumentation in general and it has already found a greater utilization in the past but it significantly lost ground to more modern versions based on ultra sonic transducers.

In order to understand this very substitution it is necessary to remember and to consider that in industry the level measured are much greater than the ones found in automotive fuel tanks. Storage tanks for liquids, solids and pastes in an industrial environment normally present great dimensions, frequently measuring many meters in height and contain between hundreds and thousands of kilos of material. As the capacitive transducers must be immersed in the product to be measured so that it may work, it ends up facing serious cost problems, corrosion protection, mechanical strength, geometry and others.

These very restrictions disappear when the volume to be measured is small—as it is the case of fuel tanks of automobile vehicles—thus making the utilization of capacitive level sensors competitive in relation to ultra sound.

SUMMARY OF THE INVENTION

A capacitor is a device that is capable to store (or "entertain") an electric charge. Physically it is composed of two electrodes made from a conductive material, without electric contact (galvanic ally isolated) between themselves but very close indeed to each other. Its most common representation is the one with the two metallic plates assembled facing each other, but this is not the only physical form that it can assume. Two tubes, one inside the other and separated by a space also form a capacitor, as well as two strips of metal separated by an isolating plastic and rolled up are also a capacitor.

The capacitor's property with regards to the storage of an electric charge is called capacitance (C), and it is measured in Farads (F). Given any two electrodes, the capacitance between them is furnished by the following formula:

$$F = (K \times A)/d$$

Where:
F=capacitance in Farads
K=dielectric constant of the material between the electrodes
A=common area of the electrodes
d=distance between the electrodes The very factor that permits the construction of a capacitive level meter is the difference between the dielectric constants of different materials. By convention, the dielectric constant of air in normal temperature and pressure conditions is equal to 1.

Summarily, a capacitive meter would consist in two long electrodes placed within the tank, in which the internal level should be measured or determined. With a dry tank, the dielectric of the capacitor is air. When filled with water (K=38) so that the electrodes are totally covered, the measured capacitance will indicate a value 38 times higher than with the empty tank.

In the case of intermediate levels, the electrodes will be the equivalent to two capacitors connected in parallel: one with the air dielectric and the other with the water dielectric. The resulting capacitance is the sum of these two capacitors. Once the dielectric constants involved are known, all one needs to do is to measure the resulting capacitance between the electrodes in order to reach the liquid level in the container.

However, the dielectric constant of a material is not at all constant. Its value depends on the chemical structure of the material and also on its physical state. The temperature is the dielectric constant's main factor of variation and depending on the material it is not at all insignificant.

Thus in order to correctly measure the level of the fuel in a tank we must also measure its temperature in order to make the necessary correction. In the case of automotive fuels, the problem still faces two aggravating factors: (i) the dielectric constant low value; and (ii) the composition variation of the fuel (gasoline (petrol)/alcohol mixture, for instance).

Whilst water has a high dielectric constant—something which facilitates the measuring—the fuels are far from this and although the fuel in Brazil is a mixture which contains alcohol—something which favours the measuring—as for the capacitive meter must be developed considering the other combinations around the world, including pure gasoline (petrol), which is an objective of the present invention.

This problem can be surpassed by alternative solutions amongst which those stand out: (i) to increase the area of the capacitor; (ii) to reduce its distancing to the minimal practiced; and (iii) increase the precision and the resolution of the measuring circuit, the great trap being the fact that the atmosphere inside the tank is not exactly formed by air. Vapours of the very fuel, something that must increase its dielectric constant and consequently worsens the relation to less than 2:1, saturate the atmosphere.

The variations of the dielectric constant with regards to the temperature, of both the "air" and the fuel can be corrected with relative ease by a programme built-in the meter's microprocessor.

Another important error factor is the variation that will certainly exist between the different fuels of the same type, which finds its maximum point in vehicles of the multiple fuel type.

The solution for this problem is classic: the use of a second (small) pair of electrodes permanently immersed in the lower part of the device, which would function as a reference for the whole system. In the case of a totally empty tank, the capacitance difference in this primary reference element would be so low that the meter programme could easily identify the situation. Apart from that, the meters preview a fuel reserve in the form of an "elevated zero" in its gauge in order to minimize dry spells when of the normal use of the vehicle. This very characteristic works favourably for the capacitive meter, which would then only indicate something from a minimum value in the main electrodes.

With regards to the variation of the dielectric constant in the tanks atmosphere, another pair of reference electrodes this time placed in the higher part of the meter could be utilized. This second reference would be exposed to the atmosphere (operating "in-dry") most of the time and determining the K of the atmosphere so that the programme could carry out the correction. In the case of a completely full tank, this electrode would be drowned—with the capacitance difference in consequence easily detectable.

For the measurement of a nearly full tank two options are available. In the first option, a "dead" measuring zone—such as the case of the empty tank—would be computed as 100% of the level. In a second option more elegant and somewhat more complicated—every time the controller detects the presence of a fluid in these elevated electrodes, the main electrode (lower) would be necessarily drowned, and could then serve as a reference for the auxiliary electrode whilst the level does not go down to the point of uncovering it. The lowest point of the reference electrodes could be placed a few millimetres below the highest point of the main electrodes, thus creating a super-positioning zone, which would facilitate the software and would minimize discontinuities in the measuring zone.

As the tanks geometry is asymmetric, thus generating linearity problems in the signal, this linearity is carried out in a "virtual" manner with the microprocessor through a table recorded in the chip itself.

The additional advantage is that the same circuit can be used in different tanks. More than this: the product can be manufactured with a standard linear table, pre tested and stored. At the time of the circuit's insertion in the final product, a device in the assembly line can record the correct table (or tables) for the vehicle's model to which it is destined, thus customizing the set. This process has positive reflexes in logistics; it reduces the number of variations and permits the stocking of "blank" measuring circuits waiting customizing, facilitating the production.

In the end, the virtual linearity can be done and tested in a matter of hours for the client instead of the weeks needed for the development of a new "thick film" potentiometer.

The fading of the level signal in this solution is also simplified. Firstly because the measuring is carried out in a sealed chamber, which access by the fuel can be adjusted to provide a natural fading. The oscillations and even the sloped plan effects over the geometry of the liquid column are many more times smaller than in the solutions with a buoy mechanism.

A second fading is obtained by software, through the application of mobile media to the readings of real time carried out by the measuring circuit. Given the processing capacity of the microprocessor, the extension of this media can be adjusted "on the fly" by the meter, "hardening" the signal in extreme situations (as in off road, for example), and smoothing the fading in normal conditions of use. For this, the controller uses the very amplitude and frequency of the fuel oscillations in order to determine the best fading factor.

Finally with regards to the interface of the device according to the present invention with the existing systems, typically the panel indicators wait in order to see a "resistive signal" only coming from the meter. However, technically they are nothing more than mille ampere meters measuring the current between its terminals by which an electronic meter can precisely emulate this current and furnish it to the indicator on the vehicle's panel, which will not be capable of knowing if the information was generated by a resistive element or not. Thus it is guaranteed the compatibility of the meter with the existing indicators, without any modification.

In the appropriate moment, the panel indicator could have its cost reduced with the elimination of the tank's signal fading (a task already carried out by the meter itself), and could have been simplified in order to work with different currents coming from the tank.

According to the present invention, the above-mentioned objectives are carried out by the provision of a device for the indication of the level of a stored liquid inside a container, of the type comprising pairs of conducting electrodes having pre determined surface areas, away from each other by an also pre determined distance which could be totally or partially occupied by the liquid which volume must be determined, connected to a Wien bridge in substitution to one of its capacitors, in order to generate an outgoing signal representing the liquid level inside the container.

BRIEF DESCRIPTION OF THE DRAWINGS

The present invention will be from hereon described as a non-limitative example with regards to its presently preferred embodiment in the annexed drawings, in which.

DETAILED DESCRIPTION OF THE PREFERRED EMBODIMENT

A presently preferred specific embodiment of the present invention is illustrated as an example in the attached drawings and it will be described in details hereinafter. However it is to be understood that while the present invention is susceptible to various modifications and alterations in form and in dimension, the present specification does not intend to limit the invention to the particular forms and/or dimensions hereby described but, on the contrary, to cover all such modifications and alternative embodiments which may be considered as within the spirit and scope of the invention, as defined by the attached claims.

Figure 1:
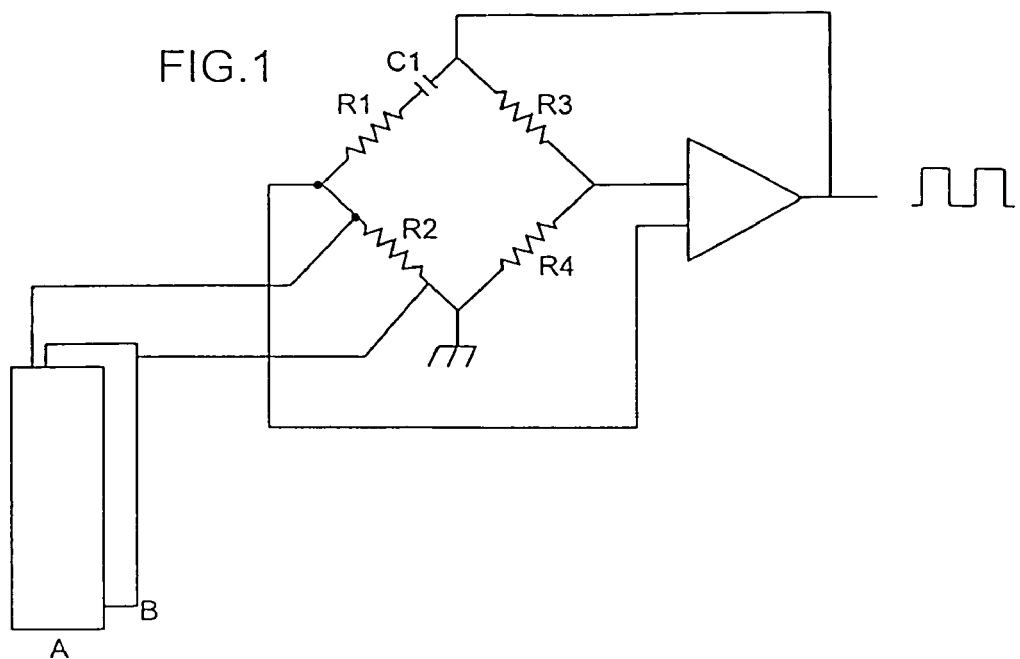
FIG. 1 is a schematic representation of a pair of electrodes connected to a Wien bridge, in substitution to one of its capacitors, in accordance to the present invention.

With particular reference now to FIG. 1, the present invention comprises two fixed metallic electrodes (A and B) positioned in the interior of the tank in such a position as to be immersed in the fuel, said electrodes being separated by a gap having a suitable, predetermined distance, therefore defining a space through which the fuel penetrates.

The interstice between electrodes A, B has its geometry determined only by the format of the electrodes, which can be rectangular, annular or any other format as long as it satisfies the mechanical requirements of the design of the apparatus.

The electrodes are connected to an electronic circuit (C) capable of generating a signal proportional to two characteristics typical to the fluid: its conductivity and its dielectric constant.

Circuit (C) is designed in such a manner as not to couple continuous currents to the electrodes, which coupling would generate undesirable electrolytic effects in fuel, nor to operate with sufficiently high energies, which could place at risk the safety of the system.

FIG. 1 details circuit (C), consisting of an oscillator in a Wien bridge wherein one of its capacitors is substituted by electrodes A and B above described.

The output from oscillator is a frequency signal determined by the following equation:

$$f_o = \frac{1}{2\pi\sqrt{R_1 \times C_1 \times R_2 \times C_2}}$$

wherein:

$C_2$ is the capacitance between electrodes A and B and $R_2$ is the resistance represented by the combination in parallel of a fixed resistor in the circuit, in counter position with the conductivity represented by the conducting provided by the very fluid between the electrodes A and B.

This way, electrodes A and B modify the balance of the Wien bridge and consequently the oscillation frequency of the circuit regarding to three parameters: (i) the ratio between the area of electrodes occupied by the liquid phase and the area occupied by the gaseous area inside the tank; (ii) the ratio between the dielectric constants of the liquid and the gaseous phases which modify the medium capacitance of the electrodes; and (iii) the ratio between the conductivities of the liquid and the gaseous phases, which modify the medium conductance of the electrodes.

Consequently, the output signal generated by the oscillator is representative of the level of the fuel inside the tank, and also of two physical characteristics of the fluids.

Figure 2:
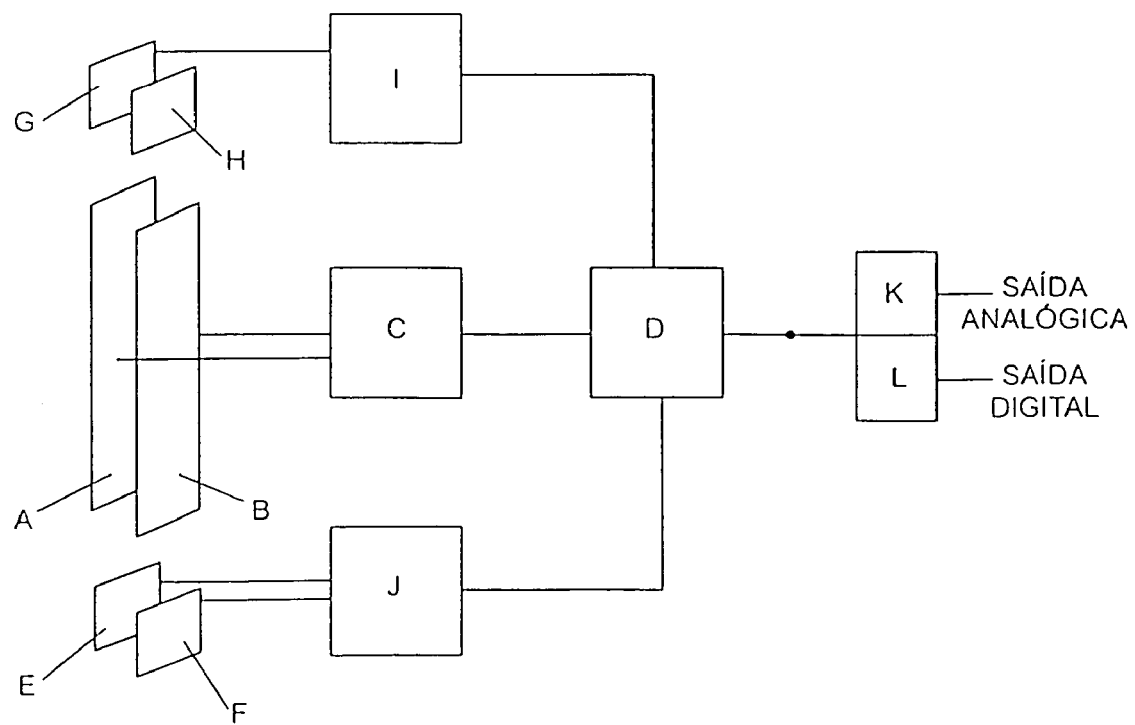
FIG. 2 is a schematic representation of the disposition of the electrodes pairs inside a fuel tank.

With more particular reference now to FIG. 2, two additional pairs of electrodes (E-F and G-H) having exactly the same characteristics of first pair A, B, but a smaller size, are used to measure the same physical characteristics in different positions inside the tank, in order to be used as a reference.

The second pair of electrodes E, F is positioned inside the tank in its lower most part, to be totally immersed in the fuel most of the time and third pair of electrodes G, H is positioned inside the tank at the highest possible position, so that it is subject only to the gases in the tank (typically a mixture of air and vapours of the fuel itself).

These two auxiliary pair of electrodes are connected to a second and third Wien bridges circuits I and J, respectively, which are similar to the Wien bridge circuit C.

The signals generated by Wien bridge circuits C, I and J as a consequence of the signals received from the first, second and third pairs of electrodes A, B; E, F and G, H are fed to a digital circuit D which processes the required linearity calculations, with the information from circuits I and J being used as reference to determine the level and the quality of the fuel in the tank. The data required to execute the linearity calculations is stored in tables in the memory of the digital circuit.

Finally, the information about the level and the quality of the fuel is supplied to interface circuits K and L which forward this information to visual displays at the vehicle's dashboard or to other devices. These signals can be analogical, digital, mixed or any other standard adaptable to a device or an existing system.

The measuring system according to the present invention as described above represents a significant improvement when compared to the existing measuring systems, particularly due to its capacity to determine in addition to the volume, also the quality of the fuel stored in the tank.

Also, the measuring apparatus according to the present invention eliminates the moving parts and permits the use of any necessary linearity curve to the application, even after the component is produced, without the need of any physical change in the product, at any time, thus facilitating the logistics and cutting the cost of maintenance of stock by the user.

Finally, the measuring system according to the present invention is capable of determining the existence of the most common chemical contaminants in vehicles driven by a sole fuel, or by a combination of existing fuels in the tank of multi combustible vehicles.

The present invention has been described with reference to specific details of particular embodiments thereof. It is not intended that such details be regarded as limitations upon the scope of the invention except insofar as and to the extent that they are included in the accompanying claims.

What is claimed is:

1. An apparatus for measuring and indicating the level and/or volume of a liquid stored in a container, said apparatus comprising:

a first pair of electrodes mounted in the interior of the container in such a position that both of the electrodes of the first pair are partially or totally immersed in the liquid stored in the container, said pair of electrodes acting as one of the capacitors of a first Wien bridge to modify the output signal generated by the bridge-circuit to, in addition to measuring and indicating the volume of the liquid, also providing an indication of the quality of the liquid in the container and the ratio between two different types of liquid stored in the container;

a second pair of electrodes, distinct from the first pair of electrodes, mounted in the interior of the container in such a position that both of the electrodes of the second pair are permanently totally immersed in the liquid, the second pair of electrodes acting as one of the capacitors of a second Wien bridge to modify the output signal generated by the bridge-circuit to create a second output signal which is used as a reference for the calculation of the volume, the quality and the ratio between the two different types of fuel in said container.

2. The apparatus according to claim 1, wherein each electrode in said pair of electrodes has a predetermined geometry and dimension.

3. The apparatus according to claim 2, wherein said liquid is a liquid fuel.

4. The apparatus according to claim 3, wherein said liquid fuel is a combination of two or more types of liquid fuel.

5. The apparatus according to claim 1, wherein said container is a fuel tank in an automobile vehicle.

6. The apparatus according to claim 1, additionally comprising at least a third pair of electrodes positioned in the interior of said container in such a position that the electrodes are totally prevented from any possible contact with the liquid stored in the container, said third pair of electrodes acting as one of the capacitors of a third Wien bridge to modify the output signal generated by the bridge-circuit in order to create a third output signal indicative of the characteristics of the air in the interior of the container, which signal serves as a reference to calculate the volume, the quality and/or the ratio between two different types of fuel in said container.

7. The apparatus according to claim 1, wherein the output signals from said Wien bridge-circuits are fed to a processing circuit which calculates the volume, the quality and/or the ratio between the two different types of fuel in said container.

8. The apparatus according to claim 6, wherein the output signals from said Wien bridge-circuits are fed to a processing circuit which calculates the volume, the quality and/or the ratio between the two different types of fuel in said container.

9. The apparatus of claim 1, wherein the both of the electrodes of the second pair are smaller than the both the electrodes of the first pair of electrodes.

10. The apparatus of claim 6, wherein the both of the electrodes of the third pair are smaller than the both the electrodes of the first pair of electrodes.

\* \* \* \* \*